US010868864B2

(12) United States Patent
Hamrick, Jr.

(10) Patent No.: US 10,868,864 B2
(45) Date of Patent: Dec. 15, 2020

(54) SYSTEM AND METHOD FOR FAULT-TOLERANT REMOTE DIRECT MEMORY ACCESS USING SINGLE PORT HOST CHANNEL ADAPTER HARDWARE

(71) Applicant: HEWLETT PACKARD ENTERPRISE DEVELOPMENT LP, Houston, TX (US)

(72) Inventor: James R Hamrick, Jr., Wildomar, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 295 days.

(21) Appl. No.: 15/954,398

(22) Filed: Apr. 16, 2018

(65) Prior Publication Data
US 2019/0320019 A1 Oct. 17, 2019

(51) Int. Cl.
*H04L 29/08* (2006.01)
*H04L 12/24* (2006.01)
*H04L 12/931* (2013.01)

(52) U.S. Cl.
CPC ...... *H04L 67/1097* (2013.01); *H04L 41/0654* (2013.01); *H04L 49/358* (2013.01); *H04L 67/2842* (2013.01)

(58) Field of Classification Search
CPC ............... H04L 67/1097; H04L 49/358; H04L 41/0654; H04L 67/2842

USPC ........................................................ 709/212
See application file for complete search history.

(56) References Cited

U.S. PATENT DOCUMENTS

| 6,721,806 B2 | 4/2004 | Boyd et al. |
| 7,010,607 B1* | 3/2006 | Bunton ............... H04L 1/18 709/228 |
| 9,787,590 B2* | 10/2017 | Sivan ............... H04L 41/0668 |
| 2002/0191599 A1* | 12/2002 | Parthasarathy ....... G06F 9/3004 370/389 |
| 2011/0173396 A1* | 7/2011 | Sugumar ............. G06F 12/0862 711/137 |

OTHER PUBLICATIONS

"InfiniBand Architecture Specification vol. 1, Release 1.2.1", Nov. 2007, 1727 pages.
"NCSL ES" version 4.50, Mar. 23, 2017, 244 pages.

* cited by examiner

*Primary Examiner* — Minh Chau Nguyen
(74) *Attorney, Agent, or Firm* — McDermott Will & Emery (57) ABSTRACT

A fault-tolerant Remote Direct Memory Access (RDMA) system and method enables RDMA operations for a given queue pair to be initiated over first and second network fabrics associated with first and second physical R_Keys. The fault-tolerant RDMA system/method supports host channel adapter hardware having only one port while maintaining network fabric fault tolerance by virtualizing the R_Key associated with the first and second network fabrics.

15 Claims, 7 Drawing Sheets

SYSTEM AND METHOD FOR FAULT-TOLERANT REMOTE DIRECT MEMORY ACCESS USING SINGLE PORT HOST CHANNEL ADAPTER HARDWARE

BACKGROUND

Fault tolerance is an important part of the value proposition for particular computing environments. For example, network fabric fault tolerance is important for mission critical systems, which may use the InfiniBand standard. Recently, InfiniBand-compliant host channel adapters, which have included two ports in the past, have been modified to include only one port. A system and/or method for tolerating network fabric faults for use with host channel adapters having only one port represents an advancement in the art.

BRIEF DESCRIPTION OF THE DRAWINGS

The following detailed description references the drawings, wherein.

Throughout the drawings, identical reference numbers may designate similar, but not necessarily identical, elements. Use herein of a reference numeral without an index number, where such reference numeral is referred to elsewhere with an index number, may be a general reference to the corresponding plural elements, collectively or individually.

DETAILED DESCRIPTION

Mission critical systems may comprise a series of server computers providing integrated hardware and software solutions for critical computing environments for which eliminating system downtime is a primary objective. Often times mission critical systems adhere to a computer-networking communications standard shared by many high-performance computing environments and systems and commonly known as InfiniBand. These mission critical computer systems obtain very high throughput with low latency through data interconnects between and within computing devices, such as servers and storage systems. It may be desirable for example embodiments of mission critical systems to realize network fabric fault tolerance.

Switching fabric network topologies may use Remote Direct Memory Access technology (RDMA). RDMA allows one computing client to place information directly into the memory of another computing client. RDMA allows user applications to directly access hardware and perform zero-copy data movement. In other words, a combination of hardware and software allows user applications to read and write to the memory of a remote computing device/client without kernel intervention or unnecessary data copies. This feature may result in lower Central Processing Unit (CPU) utilization per I/O operation and more efficient use of machine resources because applications place most of the messaging burden on specialized high-speed network hardware.

The queue pair is an architectural element used to transmit and receive message between computing components. For example, queue pairs are used in switching fabric network topologies, e.g., networks using the InfiniBand standard. In accordance therewith, communication occurs between queue pairs, instead of between ports. A queue pair is an addressable entity that includes two working queues: a send queue and a receive queue. A host channel adapter hardware component arbitrates communication by multiplexing access to the send queue or demultiplexing messages on the receive queue. As discussed further hereinbelow, network fabric fault tolerance for RDMA operations between computing clients may have been previously implemented by switching fabric-compatible host channel adapters that included two ports. As a result of the legacy two-port host channel adapter design, RDMA operations for a given queue pair could be initiated over either of the two ports. With two-port host channel adapters, when one network fabric experienced a fault, no interruption would be experienced because transmissions could be sent/received by either of the two ports.

Exemplary mission critical systems have recently been expanded, through the introduction of virtualization therein, to implement virtualized mission critical operating systems. Virtualization allows for a user/operator to create a virtual machine from a physical resource, e.g., a physical server, storage system, and/or another suitable physical resource, and share that resource with other virtual machines, a host operating system, and/or other system components for which access to the virtual machine is desirable. Each virtual machine operates with a guest operating system that may be separate from the host operating system.

Further, it may be desirable for the virtual machine implementation of mission critical systems to use hardware that supports virtualization, but does not support previously developed fabric fault tolerance for RDMA operations. For example, embodiments of mission critical systems may use InfiniBand-compatible host channel adapters having only one port. Omission of a second port from the host channel adapter has led to the problem of maintaining network fabric fault tolerance while transmitting information through only one port. The present disclosure develops the missing fabric fault tolerance support for RDMA. A fault-tolerant RDMA system/method 100 (FIGS. 1-5) enables virtualized mission critical systems. This feature is significant because fault tolerance is integral to the value of example mission critical system families including virtualized mission critical embodiments thereof.

As noted hereinabove, previously, switching fabric-compatible host channel adapters included two ports, and RDMA operations for a given queue pair could be initiated over either of those ports thereby resulting in network fabric fault tolerance. However, without the solution described in the present disclosure, a single-port host channel adapter only permits RDMA operations for a queue pair to be performed over a single network fabric. As illustrated in FIGS. 1-5, a fault-tolerant RDMA system/method 100 allows RDMA operations for a given queue pair to be initiated over first and second fabrics 136, 138 associated with first and second host channel adapters 104, 106 (see FIGS. 1 and 2B). Further, the fault-tolerant RDMA system/method 100 results in performance comparable to RDMA fault tolerance provided by host channel adapters implementing RDMA over two ports. An additional benefit of the fault-tolerant RDMA system/method 100 is that it may support mixing and matching of different host channel adapter hardware, such as host channel adapters manufactured by different vendors. As an example, this system may support host channel adapters developed by Mellanox Technologies, Inc.

The fault-tolerant RDMA system/method 100 comprises a library 102 providing access to a collection of non-volatile resources and implementations of computing protocols implemented by the fault-tolerant RDMA system/method 100. In an example embodiment, the library 102 may comprise a NonStop Connection Services Library (NCSL) (see FIG. 2A). Insofar as NCSL is used as a component of functions called in the drawings (e.g., "ncsl_rkey_request( )"), these functions are examples of functions that may be called by one or more libraries implementing the fault-tolerant RDMA system/method 100 that is the subject of the present disclosure. The library 102 is a software library that may operate in conjunction with the OpenFabrics Enterprise Distribution (OFED) library. The OpenFabrics Alliance is a trade organization that supports the three major RDMA fabric technologies: InfiniBand, RDMA over Converged Ethernet (RoCE), and Internet Wide-area RDMA Protocol (iWARP). Example mission critical systems may incorporate NCSL implementations on the NSK operating system, in a user-mode library on Linux, and in a kernel-mode driver on Linux. The computing clients of example mission critical systems communicate with one another via the library 102.

Figure 1:
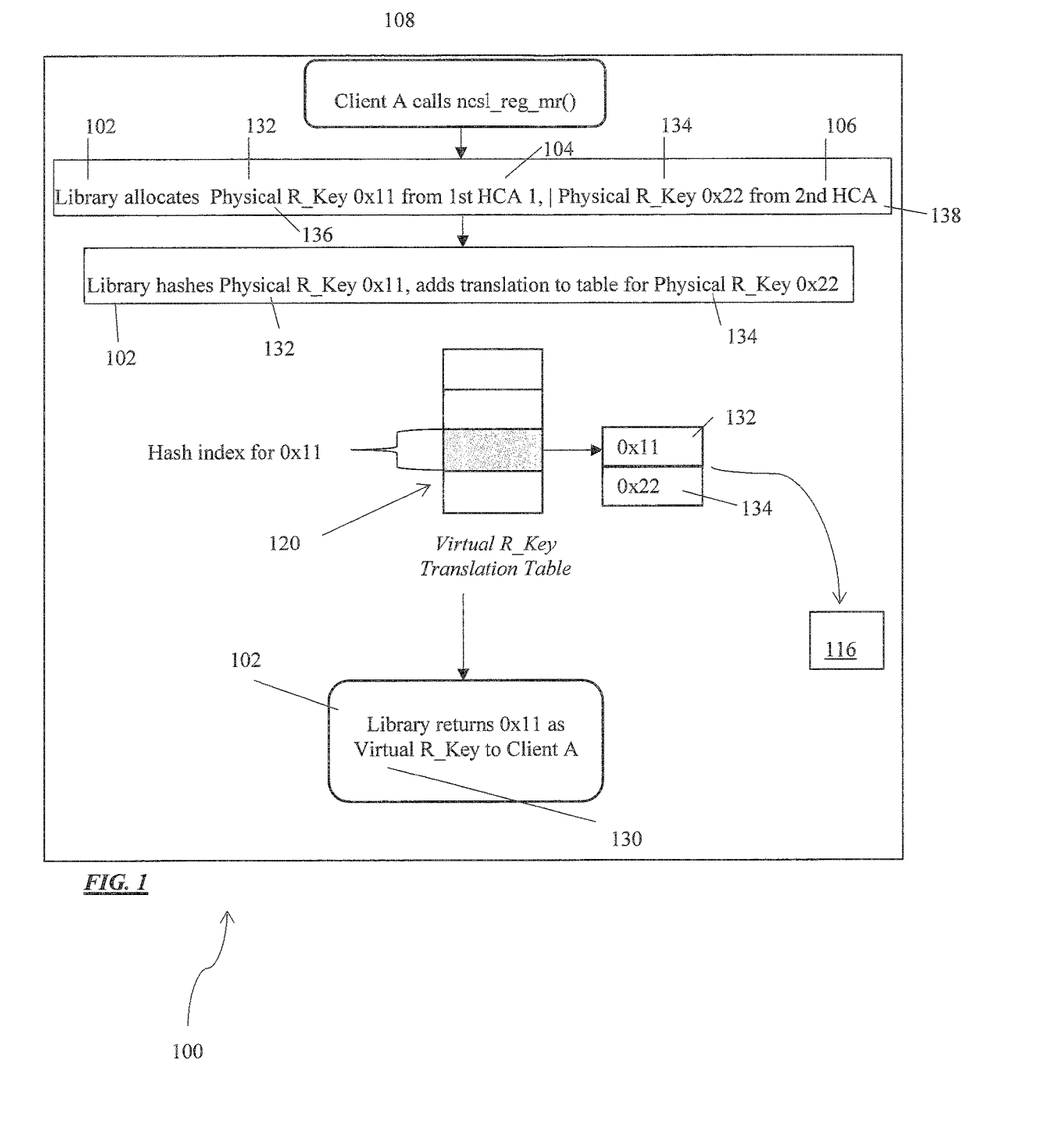
FIG. 1 is a block diagram illustrating development of a translation table for translating two or more physical R_Keys to one virtual R_Key.

Referring now to FIG. 1, an example fault-tolerant RDMA operation of system/method 100 begins with a first client 108 (Client A) requesting a virtual R_Key 130 to allow a second client 110 (Client B) to remotely access the memory of the first client 108 (Client A). Hereinthroughout client may refer to a piece of computer hardware or software that accesses a service and/or memory location, physical and/or virtual, made available according to a switching network-compliant standard, e.g., the InfiniBand standard. To begin an example RDMA operation 112, the first client 108 (Client A) calls a function to establish an address and the virtual R_Key 130 for accessing a remote memory portion. Still further, this function allocates a physical R_Key 132 from the first host channel adapter 104, and a physical R_Key 134 from the second host channel adapter 106. The physical R_Keys 132, 134 are identifiers used in accordance with the switching network-compliant standard for remotely accessing a memory region. Here, the physical R_Keys 132, 134 provide access control to the remote memory portion. In example embodiments, the R_Key is a 32-bit value provided by a remote InfiniBand host channel adapter. R_Key interpretations are hardware-specific and may depend on the vendor/manufacturer of a particular host channel adapter employed by the switching network compatible system.

Also in FIG. 1, a virtual R_Key translation table 120 is developed. The virtual R_Key translation table 120 may be formatted as a hash table, although other suitable data structures may be used. The virtual R_Key translation table 120 associates the virtual R_Key 130 with both of the physical R_Keys 132, 134. Here, the value of the virtual R_Key 130 is the same as the first physical R_Key 132 and is further associated, in the translation table 120, with a value of the second physical R_Key 134. In example embodiments, because the virtual R_Key 130 is the same as the physical R_Key 132 associated with the first fabric 136, the virtual R_Key 130 is quickly and easily translated to the physical R_Key 136 for RDMA operations that are performed on the first fabric 136. This example embodiment may save space in the virtual R_Key translation table 120, which would otherwise be required to hold the translation from the virtual R_Key 130 to the first physical R_Key 132 associated with the first fabric 136 in addition to the translation from the virtual R_Key 130 to the second physical R_Key 134 that is already stored in the virtual R_Key translation table 120.

Figure 2A:
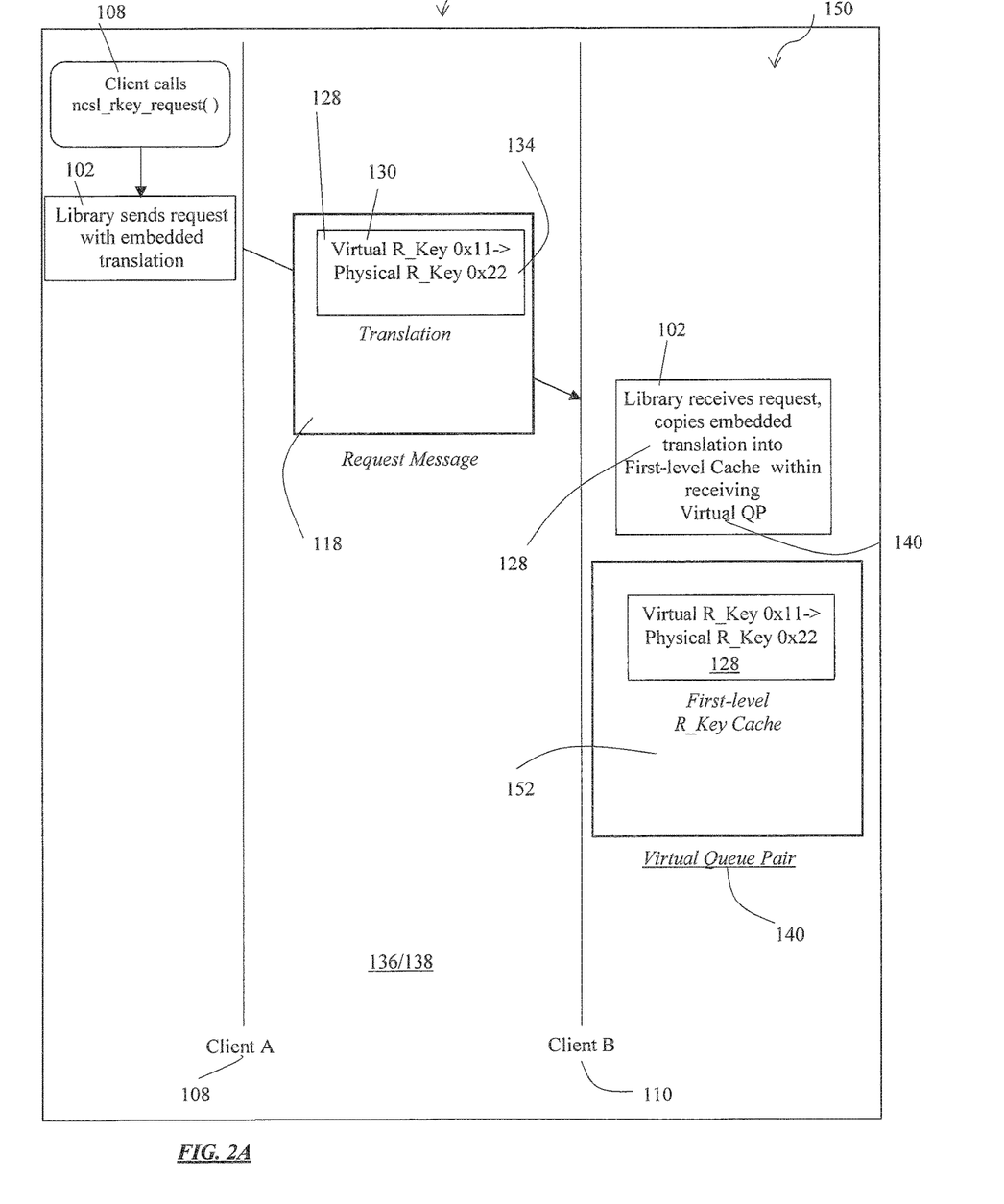
FIG. 2A is a diagram illustrating transmission of a work request and a virtual R_Key translation from a first client to a second client, according to an example.

As mentioned hereinabove, the virtual R_Key 130 is relatively fast and efficient to translate when the RDMA operation 112 is performed on the first fabric 136. Therefore, FIGS. 2A-5 depict example embodiments wherein the RDMA operation 112 is being performed on the second fabric 138. Referring now to FIG. 2A, before the RDMA operation 112 is performed, a request message 118 containing information about the RDMA operation 112 is submitted by the first client 108 (Client A) to the second client 110 (Client B) by way of a virtual queue pair 140. The library 102 of the first client 108 (Client A) that developed with the virtual queue pair 140 places a memory address, the virtual R_Key 130 (from the virtual R_Key translation table 120), and the second physical R_Key 134 (associated in the virtual R_Key translation table 120 with the virtual R_Key 130) into the request message 118 and transmits said request message 118 to the library 102 of the second client 110. The library 102 of the second client 110 enters the association between the virtual R_Key 130 and the physical R_Key 134 into a cache 150 (see FIG. 5) associated with the receiving virtual queue pair 140. Once the cache entry is completed, the request message 118 is passed to the second library client 110. The second library client 110 then examines the request message 118, and determines a location within the address space of the first client 108 whereto the second library client 110 should perform the RDMA operation 112 in order to move data into or out of said address space. This determination is made before the processing of the request message 118 is completed.

Figure 3:
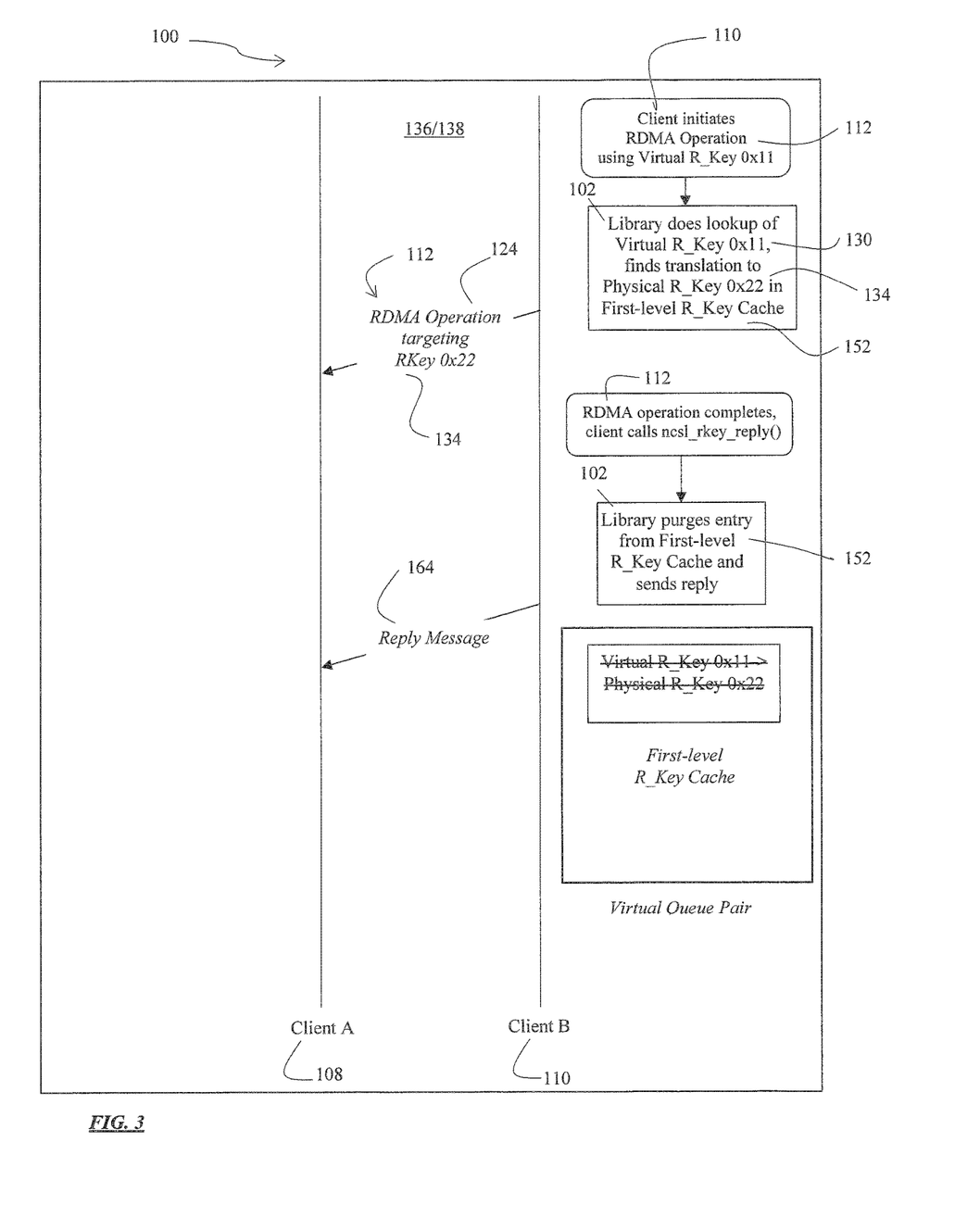
FIG. 3 is a diagram illustrating an Remote Direct Memory Access operation using the virtual R_Key of FIG. 1 and accessing a first-level cache, according to an example.

Referring now to FIG. 3, the second library client 110 uses the memory address and virtual R_Key 130 from the request message 118 to format the RDMA request/operation 112. The RDMA request/operation 112 is submitted to the library 102 of the second client 110. Upon receipt of the RDMA request/operation 112 the library 102 of the second client 110 translates the virtual R_Key 130 into the physical R_Key 134. Then the physical R_Key 134 is used to format an RDMA transport packet 124. The transport packet 124 is transmitted over a connection associated with the second fabric 138 supported by the virtual queue pair 140. The remote host channel adapter 104 receives the transport packet 124. Upon receipt thereof, the host channel adapter 104 validates the physical R_Key 134 and the memory address. Once validation has taken place, the host channel adapter 104 proceeds with execution of the RDMA operation 112.

As noted hereinabove, the presence of two independent network fabrics prevents a single network fabric fault from obstructing the RDMA operation 112 from being performed. In the prior art, a single InfiniBand host channel adapter having two ports, either of which is suitable for conveying the RDMA transport packet, provided network fabric fault tolerance, i.e., a fault in one fabric associated with one (or the other) of the two ports could be tolerated because the other fabric associated with the second of the two ports (of the same host channel adapter) remained operational. For single port host channel adapters, two separate devices, each with one port, may be used to provide network fabric fault tolerance. However, it is challenging to use more than one host channel adapter because an R_Key that is used by one host channel adapter cannot be used by another host channel adapter. Again, as previously noted, physical R_Keys are hardware specific, thereby preventing use of a particular R_Key with a second host channel adapter.

The fault-tolerant RDMA system/method 100 virtualizes both the R_Key and the queue pair. Still further, the fault-tolerant RDMA system/method 100 implements a distributed caching protocol to manage virtual-to-physical translation of the R_Key(s) 130, 132, 134. The virtualized R_Key 130 is translated into first and second physical R_Keys 132, 134 as depicted in FIG. 1. The first and second physical R_Key 132, 134 correspond to first and second network fabrics 136, 138 associated therewith and with the first and second host channel adapters 104, 106. Therefore, the virtual R_Key 130, by way of association with the first and second physical R_Keys 132, 134, may access and exchange information across both the first and second network fabrics 136, 138. Similarly, each virtual queue pair 140 (see FIGS. 2A and 2B) has first and second physical queue pairs 142, 144 associated therewith. Again, each of the physical queue pairs 142, 144 corresponds with the first and second network fabrics 136, 138, respectively, and, therefore, with the first and second host channel adapters 104, 106, as depicted in FIGS. 1 and 2B In accordance with this embodiment, the first and second network fabrics 136, 138 are managed by the first and second host channel adapters 104, 106 from which the physical R_Keys 132, 134 and the first and second physical queue pairs 142, 144 are both allocated.

Figure 2B:
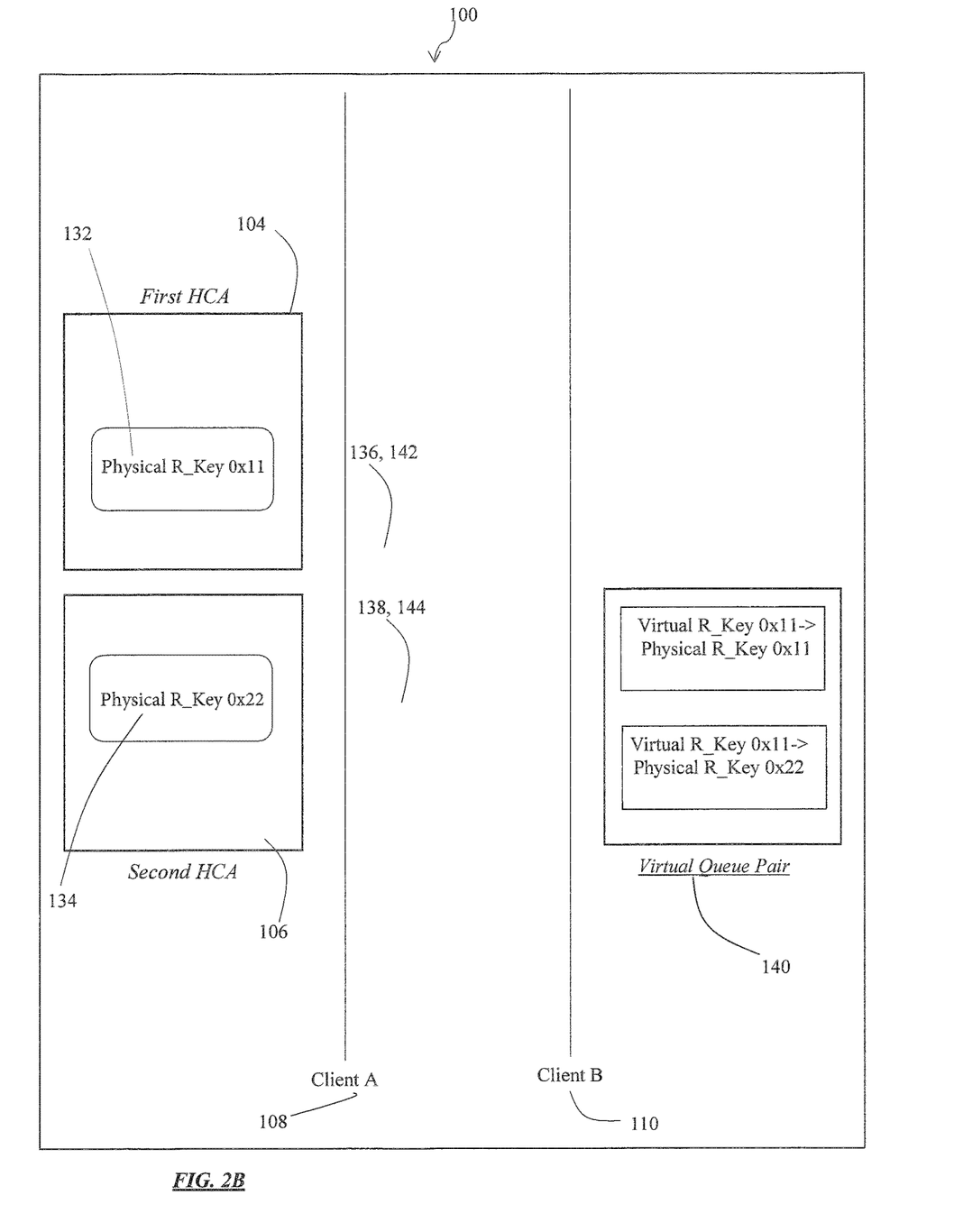
FIG. 2B is a diagram illustrating the configuration of a virtual queue pair and first and second network fabrics, according to an example.

Referring still to FIGS. 2A and 2B, when the RDMA operation 112 is initiated, after determining which of the first and second fabrics 136, 138 to use, the fault-tolerant RDMA system/method 100 selects the corresponding physical queue pair 142, 144 and translates the virtual R_Key 130 into the respective physical R_Key translation 134, as illustrated in FIG. 3. Next, the translated operation, i.e., the physical R_Key translation 132, 134 and the corresponding physical queue pair 142, 144 translated from the virtual R_Key 130 and the virtual queue pair 140, is passed to the host channel adapter 104, 106 associated with the respective first or second network fabric 136, 138 (corresponding to the physical R_Keys 132, 134 and the physical queue pairs 142, 144). The same address is used for the RDMA operation 112 whether the first or the second network fabric 136, 138 performs transmission of the RDMA operation 112. Consequently, the same remote memory portion is accessed by the virtual R_Key 130 and the virtual queue pair 140 by whichever of the first and the second network fabrics 136, 138 performs the RDMA operation 112.

As illustrated in FIGS. 2A-5, the fault-tolerant RDMA system/method 100 uses the two-level cache 150 to translate the virtual R_Key 130 into the second physical R_Key 134. A first level 152 of the cache 150 is contained in the virtual queue pair 140, and a second level 154 of the cache 150 is a global data structure 156 (see FIGS. 4 and 5) shared amongst all physical queue pairs using the second network fabric 138, such as the second queue pair 144, associated with the host channel adapter 106. When the work request 118 for the RDMA operation 112 is given to the virtual queue pair 140, the first-level cache 152 is searched for a valid translation. If the translation 128 is found within the first-level cache 152, it is used for performance of the RDMA operation 112.

If the translation 128 is not found in the first-level cache 152, the second-level cache 154 is searched for the valid translation 128. If the translation 128 is found, it is used. However, if the translation 128 is not found within the first-level cache 152 or the second-level cache 154, a cache fill operation is initiated to obtain the valid translation 128 for storage in the second-level cache 154. Following performance of the cache fill operation, the translation 128 has been fetched and it is both used for the current RDMA operation 112 and stored in the second-level cache 154 for later reference. The combination of the first-level and second-level caches 152, 154 results in a high overall cache hit rate. The high overall cache hit rate contributes to the efficiency of the fault-tolerant RDMA system/method 100.

Management of the first-level cache 152 is controlled by a client of the library 102, such as the second client 110 (Client B) in FIGS. 2A and 3. When the client 108 (Client A) creates the virtual R_Key 130 to allow a remote library client, such as the client 110 (Client B) to access the memory portion, the virtual R_Key 130 and physical R_Key 134 corresponding thereto are stored in the global R_Key translation table 120 (see FIG. 1). When the first client 108 (Client A) transmits the virtual R_Key 130 to the second client 110 (Client B) in the request message 118, the valid translation 128 of the virtual R_Key 130 to physical R_Key 134 may be piggybacked onto the request message 118 to the remote library client 110 (Client B). FIG. 2A illustrates appending or piggybacking onto the request message 118 a translation 128 of the virtual R_Key 130 to the physical R_Key 134 for storage in the first level cache 152 of the second, remote client 110 (Client B).

The remote library client 110 (Client B) that receives the piggybacked translation 128 stores it in the first-level cache 152 of the receiving virtual queue pair 140. When the remote library client 110 (Client B) completes the RDMA operations 112 using the virtual R_Key 130, it informs the remote library implementation 102, which purges the translation 128 for the virtual R_Key 130 from the first-level cache 152 managed by the second client 110 (Client B). In example embodiments, the first-level cache 152 is relatively small and there may be more R_Key translations actively in use than can be stored by the first-level cache 152.

When there are more R_Key translations actively in use than can be contained in the first-level cache 152, the first-level cache 152 overflows. When the first-level cache 152 overflows, the oldest entry in the first-level cache 152 may be purged to make room for a new entry, e.g., a new translation 128. If the remote library client 110 (Client B) subsequently attempts to use the purged cache entry, same will not be found in the first-level cache 152, but may be found in the second-level cache 154 instead.

Figure 4:
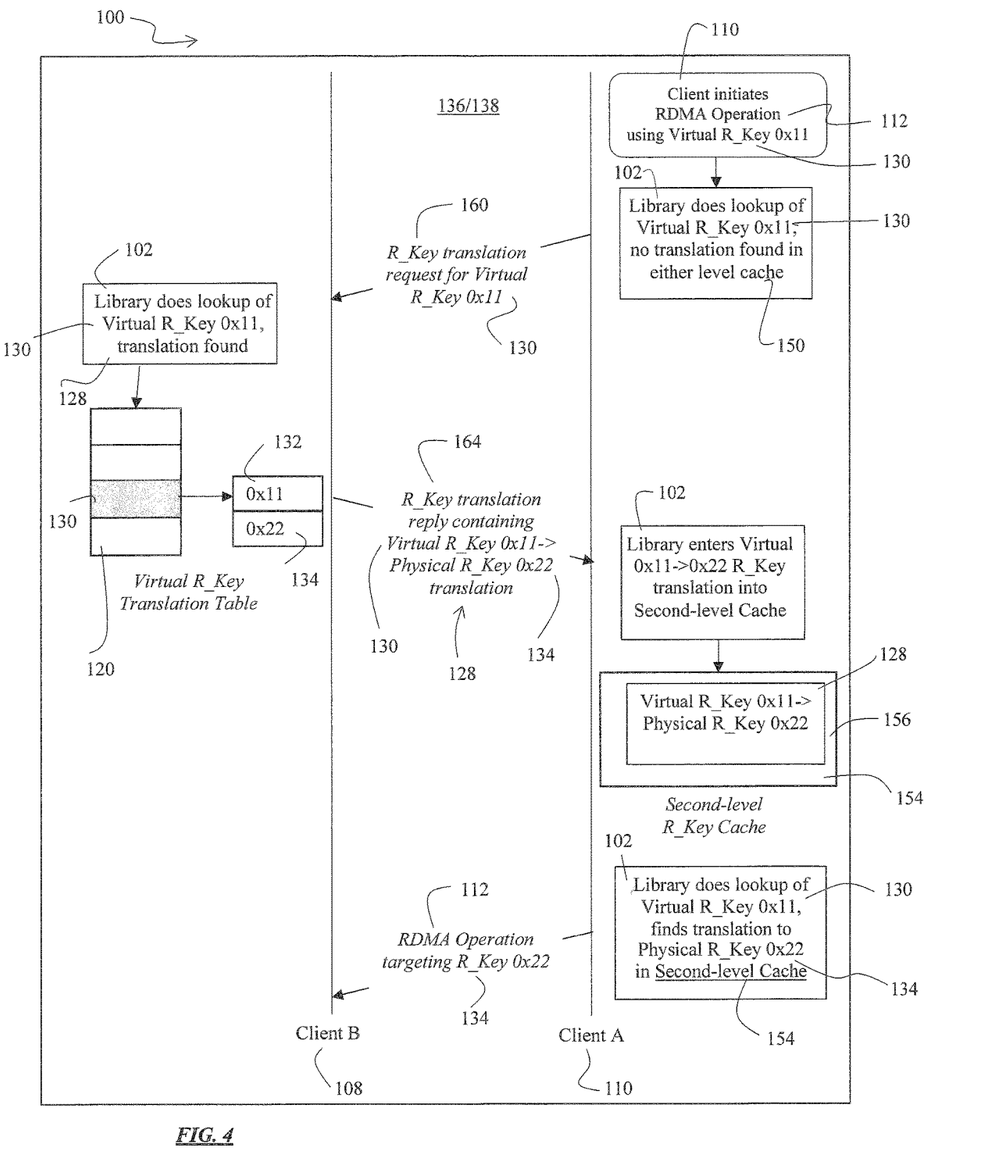
FIG. 4 is a diagram illustrating an RDMA operation using a virtual R_Key that is not found within the first-level or the second-level cache, according to an example.

Management of the second-level cache 154 is controlled by the library 102, as illustrated in FIG. 4. In order to insert the translation 128 into the second-level cache 154, a local implementation of the library 102 sends an R_Key translation request 160 out over the virtual queue pair 140 to which the RDMA operation 112 was submitted. The remote implementation of the library 102 receives the R_Key translation request 160, looks up the virtual R_Key 130 in the R_Key translation table 120 stored on the first client 108 (Client A), sends an R_Key translation reply 164, and stores an identification of the client library implementation 102 to which the translation 128 has been sent. Upon receiving the R_Key translation reply 164, the local implementation of the library 102 on the second client 110 (Client B) fills the second-level cache 154 with the translation 164 from the reply and proceeds with the RDMA operation 112.

The second-level cache 154 may also overflow. FIG. 4 depicts a miss in both of the first-level and the second-level caches 152, 154. When the second-level cache 154 overflows, the oldest entry in the second-level cache 154 is purged to make room for entry of the new translation 128 therein. If the remote library client 110 (Client B) subsequently attempts to use the purged cache entry, it will miss in the second-level cache, and the translation 128 of the purged cache entry will be fetched again. The fault-tolerant RDMA system/method 100 may operate to ensure that every entry into the second-level cache 154 is used at least once to prevent starvation.

Figure 5:
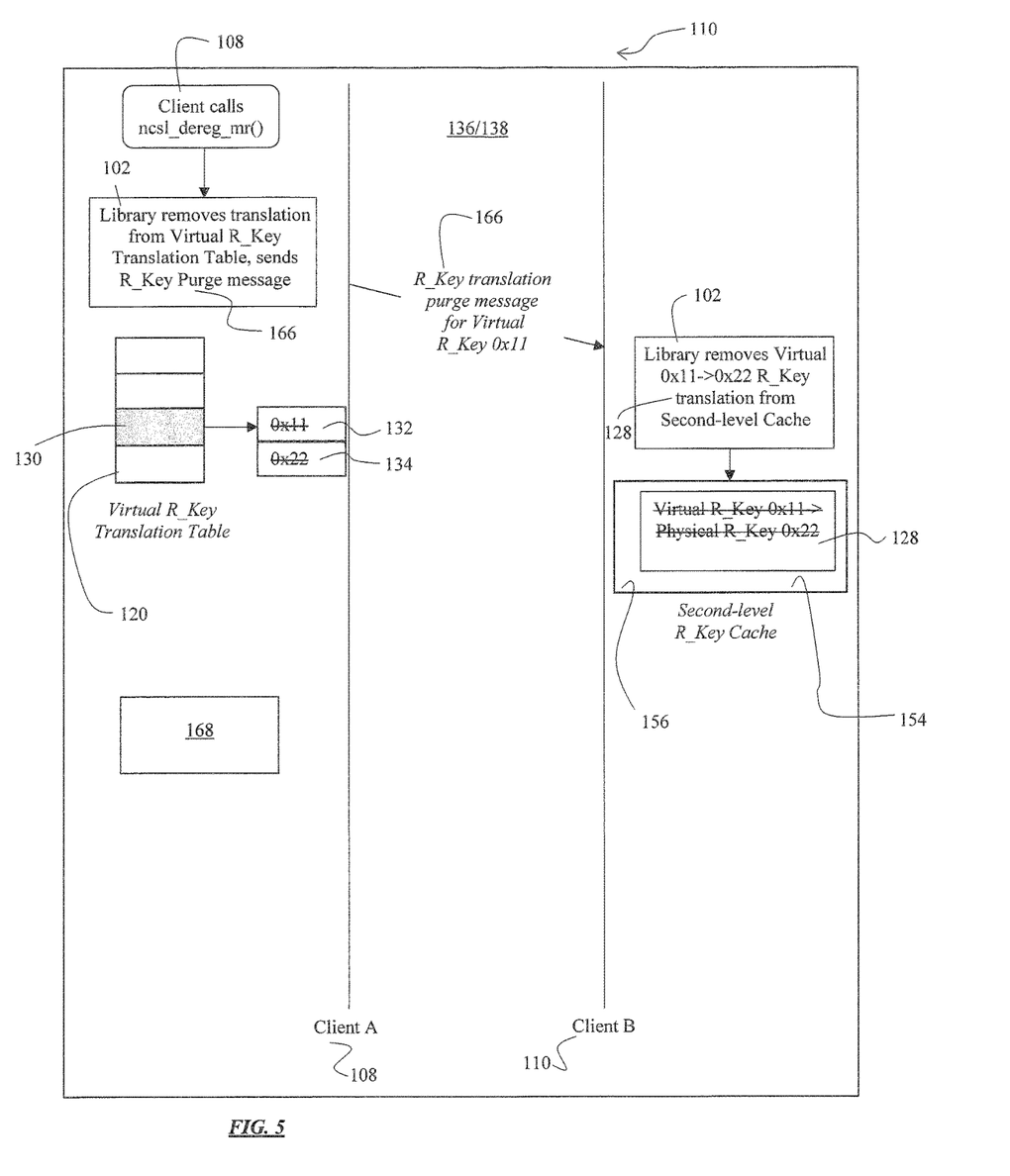
FIG. 5 is a diagram illustrating a purge of a translation from the first-level and the second-level cache, according to an example.

Referring now to FIG. 5, during operation, an R_Key translation in the second-level cache 154 may become invalid if the library client, such as the first client 108 (Client A) in FIG. 5, that created the virtual R_Key 130 destroys same. If the client 108 (Client A) destroys the virtual R_Key 130, the local implementation of the library 102 sends out an R_Key translation purge message 166 to every remote library client, including the second client 110 (Client B), that may have cached the translation 128 of the virtual R-Key 130. Each of the remote implementations of the library 102, such as on the second client 110 (Client B), that receive a purge message then purge said translation 128 from the second-level caches 154 thereof. Tracking of clients that have cached entries/translations uses a cache tracking memory 168. When the cache tracking memory 168 is fully utilized and the local client 108 (Client A) receives the incoming R_Key translation request 164 (FIG. 4), the client 108 may select the remote client storing the oldest granted translation 130, second client 110 (Client B) in the example of FIG. 5, and send that remote client 110 (Client B) the purge message 166.

Operation of the two-level cache 150 uses message exchanges that may not be possible if a connection between the physical queue pairs 142, 144 that are used to translate those messages is severed. If a connection is lost, each client, such as the second client 110 (Client B) will purge both the first and second-level caches 152, 154 of all the current translations associated with clients such as the first client 108 (Client A) with which the second client 110 (Client B) no longer has a connection. Such a full cache purge prevents retention of stale entries in the cache 150 following a lost connection. In an example, when both the network fabrics 136, 138 are disrupted, the cache 150 is purged of the entries/translations associated with the disrupted network fabrics 136, 138.

Figure 6:
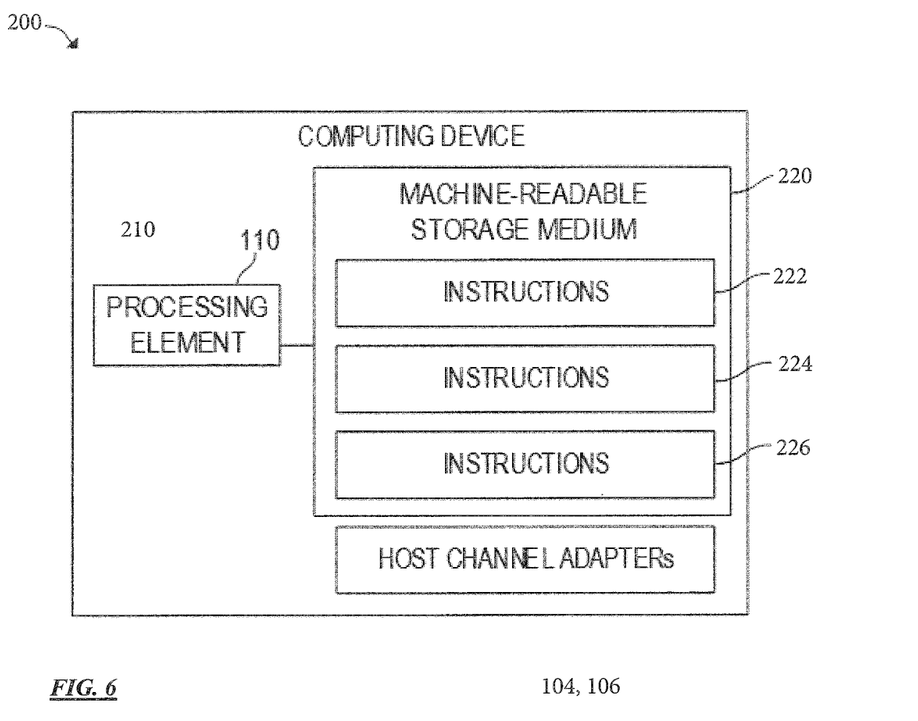
FIG. 6 is a diagram of a computing device with single-port host channel adapters that may implement the operations referenced in FIGS. 1-5.

Referring now to FIG. 6, a computing client 200 is illustrated that may comprising the clients 108, 110 and the host channel adapters 104, 106 described hereinabove. Processing element 210 may be, one or multiple central processing unit (CPU), one or multiple semiconductor-based microprocessor, one or multiple graphics processing unit (GPU), other hardware devices suitable for retrieval and execution of instructions stored in machine-readable storage medium 220, or combinations thereof. The processing element 210 can be a physical device. Moreover, in one example, the processing element 210 may include multiple cores on a chip, include multiple cores across multiple chips, multiple cores across multiple devices (e.g., if the computing device 200 includes multiple node devices), or combinations thereof. Processing element 210 may fetch, decode, and execute instructions 222, 224, 226 to implement the RDMA operations 112 and other operations between the clients 108, 110 as described hereinabove with reference to FIGS. 1-5. As an alternative or in addition to retrieving and executing instructions, processing element 210 may include at least one integrated circuit (IC), other control logic, other electronic circuits, or combinations thereof that include a number of electronic components for performing the functionality of instructions 222, 224, 226.

Machine-readable storage medium 220 may be any electronic, magnetic, optical, or other physical storage device that contains or stores executable instructions. Thus, the machine-readable storage medium 220 may be, for example, Random Access Memory (RAM), an Electrically Erasable Programmable Read-Only Memory (EEPROM), a storage drive, a Compact Disc Read Only Memory (CD-ROM), and the like. The addressable memory of each client 108, 110 may be all or a portion of the machine-readable storage medium 220 shown in FIG. 6. As such, the machine-readable storage medium 220 can be non-transitory. As described in detail herein, machine-readable storage medium 220 may be encoded with a series of executable instructions for performing the functions and operations of the fault-tolerant RDMA system/method 100.

While certain implementations have been shown and described above, various changes in form and details may be made. For example, the fault-tolerant RDMA system/method 100 may be extended to increase the number of network fabrics that may be used for fault tolerance by adding further entries to the virtual R_Key translation table 120 and the two-level cache 150 to accommodate the extra network fabrics. Also in an example, the operation to create the virtual R_Key translation and the operation to convey the translation for the virtual R_Key translation may be initiated as a single operation by the library client 108, 110 (Client A, Client B) to further increase efficiency. Generally speaking, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:
1. A computing system comprising:
   a first computing client and a second computing client;
   a plurality of host channel adapters corresponding to at least first and second network fabrics;
   a first physical R_Key and a second physical R_Key for controlling access to a memory location associated with the second computing client,
   wherein each of the first physical R_Key and the second physical R_Key controls access to the memory location over the first and second network fabrics, respectively; and
   a virtual R_Key associated with both of the first physical R_Key and the second physical R_Key,
   wherein the first computing client accesses the memory location of the second computing client over one of the at least first and second network fabrics by requesting access with the virtual R_Key.

2. The computing system of claim 1, wherein the virtual R_Key translates into at least the first physical R_Key and the second physical R_Key.

3. The computing system of claim 2, wherein a translation between the virtual R_Key and the at least first physical R_Key and the second physical R_Key is stored in a cache.

4. The computing system of claim 3, wherein the cache comprises a first cache level and a second cache level.

5. The computing system of claim 4, wherein the first cache level is managed by one computing client of the first computing client and the second computing client.

6. The computing system of claim 2, wherein the first physical R_Key and the second physical R_Key correspond to respective queue pairs.

7. The computing system of claim 6, wherein each queue pair of the queue pairs exchanges data between the first computing client and the second computing client.

8. The computing system of claim 1, wherein the at least first and second network fabrics result in a fault tolerant computing system.

9. A data exchange method comprising:
allocating first and second physical R_Keys corresponding to a memory portion;
translating the first and second physical R_Keys into a virtual R_Key;
storing a translation on at least a first client;
associating a virtual queue pair with the virtual R_Key; and
performing a remote direct memory access operation between the first client and a second client through the virtual queue pair; and
wherein the virtual R_Key directs the remote direct memory access operation to be initiated over one of a first network fabric and a second network fabric; and
wherein the first and second network fabrics are respectively associated with the first and second physical R_Keys.

10. The method of claim 9, wherein the virtual R_Key is associated with the first and second network fabrics according to a translation table stored on the first client.

11. The method of claim 10, wherein a cache stores a translation of the virtual R_Key on the second client.

12. The method of claim 11, wherein the cache is purged when all network fabrics are disrupted.

13. The method of claim 9, wherein the remote direct memory access operation of the virtual queue pair uses a host channel adapter having only one port.

14. The method of claim 13, wherein the virtual queue pair performs the remote direct memory access operation through one of the first and second network fabrics associated with the virtual R_Key.

15. The method of claim 13, wherein the steps of the data exchange method are performed by implementations of a connection services library operating on both the first and second clients.

* * * * *